United States Patent
Xu et al.

(10) Patent No.: US 8,885,085 B2
(45) Date of Patent: Nov. 11, 2014

(54) VARIABLE VOLTAGE ROW DRIVER FOR CMOS IMAGE SENSOR

(75) Inventors: Zhihao Xu, Sunnyvale, CA (US); Guangbin Zhang, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 444 days.

(21) Appl. No.: 13/363,704

(22) Filed: Feb. 1, 2012

(65) Prior Publication Data

US 2013/0193305 A1    Aug. 1, 2013

(51) Int. Cl.
*H04N 5/335* (2011.01)
*H04N 5/369* (2011.01)
*H04N 5/376* (2011.01)

(52) U.S. Cl.
CPC ............. *H04N 5/3698* (2013.01); *H04N 5/376* (2013.01)
USPC ......................................................... 348/302

(58) Field of Classification Search
CPC .............................. H04N 5/3698; H04N 5/376
USPC .................................................. 348/300–308
See application file for complete search history.

(56) References Cited

U.S. PATENT DOCUMENTS

| | | | |
|---|---|---|---|
| 6,054,704 A * | 4/2000 | Pritchard et al. | 250/208.1 |
| 6,687,157 B1 * | 2/2004 | Liu et al. | 365/185.09 |
| 6,920,078 B2 | 7/2005 | Cho | |
| 6,933,973 B1 | 8/2005 | Sako | |
| 7,447,085 B2 | 11/2008 | Boemler | |
| 7,573,013 B2 | 8/2009 | Choi et al. | |
| 8,035,718 B2 * | 10/2011 | Takayanagi et al. | 348/312 |
| 8,427,566 B2 * | 4/2013 | Fujita et al. | 348/308 |
| 2002/0140689 A1 * | 10/2002 | Huang et al. | 345/208 |
| 2006/0113461 A1 * | 6/2006 | Barna | 250/208.1 |
| 2009/0086049 A1 * | 4/2009 | Fujita et al. | 348/222.1 |
| 2013/0021058 A1 * | 1/2013 | Huang et al. | 326/38 |

* cited by examiner

*Primary Examiner* — Aung S Moe
*Assistant Examiner* — Amy Hsu
(74) *Attorney, Agent, or Firm* — Blakely Sokoloff Taylor & Zafman LLP

(57) ABSTRACT

An example image sensor includes a plurality of pixels arranged in an array of columns and rows, a row driver, and a control logic circuit. The row driver is coupled to pixels in a row of the array to provide a variable driving voltage to drive transistors included in the pixels of the row. The control logic circuit is coupled to provide one or more control logic signals to the row driver. The row driver adjusts a magnitude of the driving voltage in response to the one or more control logic signals.

14 Claims, 6 Drawing Sheets

US 8,885,085 B2

VARIABLE VOLTAGE ROW DRIVER FOR CMOS IMAGE SENSOR

TECHNICAL FIELD

This disclosure relates generally to image sensors, and in particular but not exclusively, relates to complementary metal-oxide-semiconductor ("CMOS") image sensors.

BACKGROUND INFORMATION

Image sensors have become ubiquitous. They are widely used in digital still cameras, cellular phones, security cameras, as well as, medical, automobile, and other applications. The technology used to manufacture image sensors, and in particular, complementary metal-oxide-semiconductor ("CMOS") image sensors ("CIS"), has continued to advance at great pace. For example, the demands of higher resolution and lower power consumption have encouraged the further miniaturization and integration of these image sensors.

Typically, image sensors include an array of pixels arranged in rows and columns. Each pixel may include a photodiode and several transistors to control the accumulation, transfer and resetting of charge accumulated in the photodiode. For example, an image sensor typically includes at least a source follower transistor and a row select transistor for coupling the source follower transistor to a column output line. The pixel also typically has a charge storage node, such as, a floating diffusion node which is, in turn, connected to the gate of the source follower transistor. Charge generated by the photosensor is stored at the storage node. In some arrangements, the image sensor may also include a transistor for transferring charge from the photosensor to the storage node. The image sensor also typically includes a transistor to reset the storage node before it receives photo-generated charges.

For some conventional image sensors, the transistors included in the pixel are driven with a fixed voltage source. However, as pixel sizes continue to shrink and control methods become more complex, the chip area for transferring different drive signals is becoming more limited. Also, driving a transistor in a pixel with a single fixed voltage source may affect performance of the pixel by, for example, introducing unwanted noise.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a Variable Voltage Row Driver for a CMOS Image Sensor are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
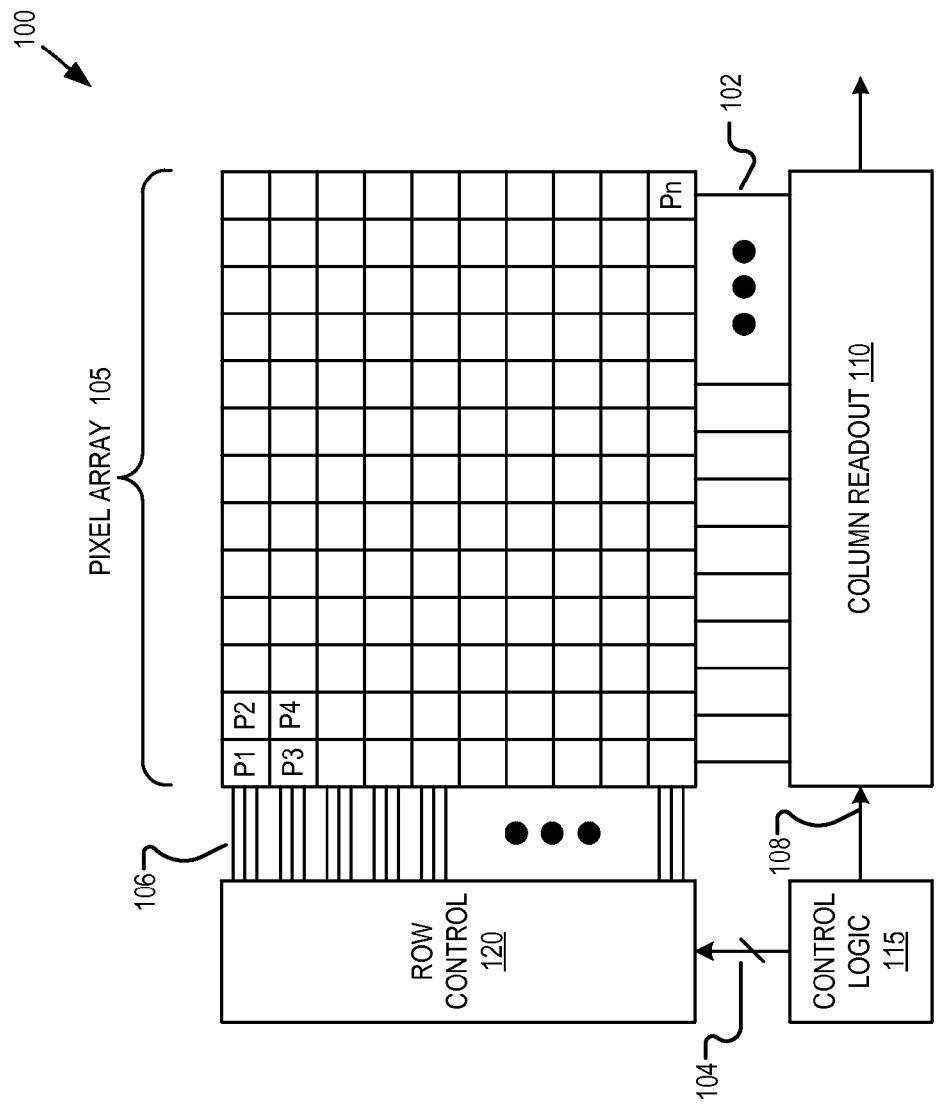
FIG. 1 is a functional block diagram illustrating an image sensor, in accordance with an embodiment of the invention.

FIG. 1 is a functional block diagram illustrating an image sensor 100, in accordance with an embodiment of the invention. The illustrated embodiment of image sensor 100 includes an active area (i.e., pixel array 105), column readout circuitry 110, control logic circuit 115, and row control 120.

For example, pixel array 105 is a two-dimensional array of backside or frontside illuminated imaging pixels (e.g., pixels P1, P2 . . . , Pn). In one embodiment, each pixel is an active pixel sensor ("APS"), such as a complementary metal-oxide-semiconductor ("CMOS") imaging pixel. As illustrated, each pixel is arranged into a row (e.g., pixels P1 and P2 are in a first row, while pixels P3 and P4 are in a second row) and a column (e.g., pixels P1 and P3 are in a first column, while pixels P2 and P4 are in a second column) to acquire image data of a person, place, or object, which can then be used to render an image of the person, place, or object.

Each pixel in pixel array 105 may include a photodiode and several transistors. Row control circuit 120 provides driving voltages to the transistors included in the pixels via row lines 106 to control the accumulation, transfer and resetting of charge accumulated in the photodiode.

After each pixel has acquired its image data or image charge, the image data is readout by column readout circuitry 110 via column bitlines 102. Column readout circuitry 110 may include amplification circuitry, analog-to-digital conversion circuitry, or otherwise. Data readout by column readout circuit 110 may be transferred simply to storage or for further manipulation of the image data by applying post image effects (e.g., crop, rotate, remove red eye, adjust brightness, adjust contrast, or otherwise).

Control logic circuit 115 is configured to control operational characteristics of pixel array 105. For example, control logic circuit 115 may generate a control logic signal 108 for enabling a column bitline 102 for readout by column readout circuit 110. Also, as will be discussed in more detail below, control logic circuit 115 may also generate control logic signals 104 for adjusting the magnitude of the driving voltages supplied on row lines 106 by row control circuit 120.

Figure 2:
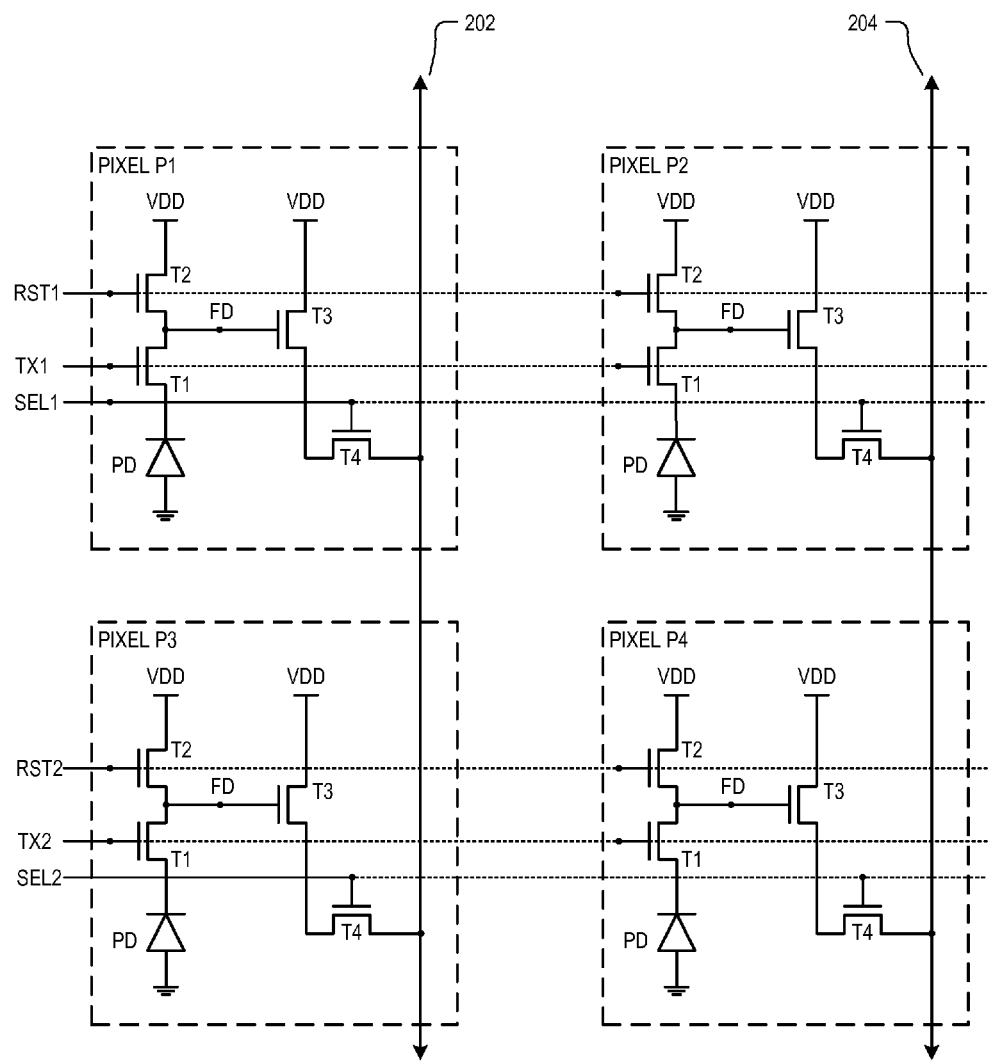
FIG. 2 is a circuit diagram illustrating pixel circuitry of four-transistor ("4T") pixels within an image sensor, in accordance with an embodiment of the invention.

FIG. 2 is a circuit diagram illustrating pixel circuitry of four-transistor ("4T") pixels (e.g., Pixels P1, P2, P3, and P4) within an image sensor, in accordance with an embodiment of the invention. Pixels P1, P2, P3, and P4 illustrate pixel circuitry architecture for implementing each pixel within pixel array 105 of FIG. 1. However, it should be appreciated that embodiments of the present invention are not limited to 4T pixel architectures; rather, one of ordinary skill in the art having the benefit of the instant disclosure will understand that the present teachings are also applicable to 3T designs, 5T designs, and various other pixel architectures.

In FIG. 2, pixels P1 and P2 are arranged in a first row and pixels P3 and P4 are arranged in a second row of the pixel array. Similarly, pixels P1 and P3 are arranged in a first column, while pixels P2 and P4 are arranged in a second column of the pixel array. The illustrated embodiment of each pixel circuitry includes a photodiode PD, a transfer transistor T1, a reset transistor T2, a source-follower ("SF") transistor T3, and a select transistor T4. During operation, transfer transistors T1 of the first row receive a transfer signal TX1, which transfers the charge accumulated in photodiode PD to a floating diffusion node FD.

Reset transistors T2 of the first row of pixels are coupled between a power rail VDD and the floating diffusion node FD to reset (e.g., discharge or charge the FD to a preset voltage) under control of a reset signal RST1. The floating diffusion node FD is coupled to the gate of SF transistor T3. SF transistor T3 is coupled between the power rail VDD and select transistor T4. SF transistor T3 operates as a source-follower providing a high impedance output from floating diffusion node FD. Finally, the select transistors T4 of the first row in the array selectively couple the output of pixel circuitry to their respective column bitline 202 and 204 under control of a select signal SEL1. In one embodiment, the TX1 signal, the RST1 signal, and the SEL1 signal are generated by row control circuitry 120 of FIG. 1 and transferred via row lines 106. In one embodiment, the row lines 106 may be routed in pixel circuitry by way of metal interconnect layers included in the image sensor.

Figure 3:
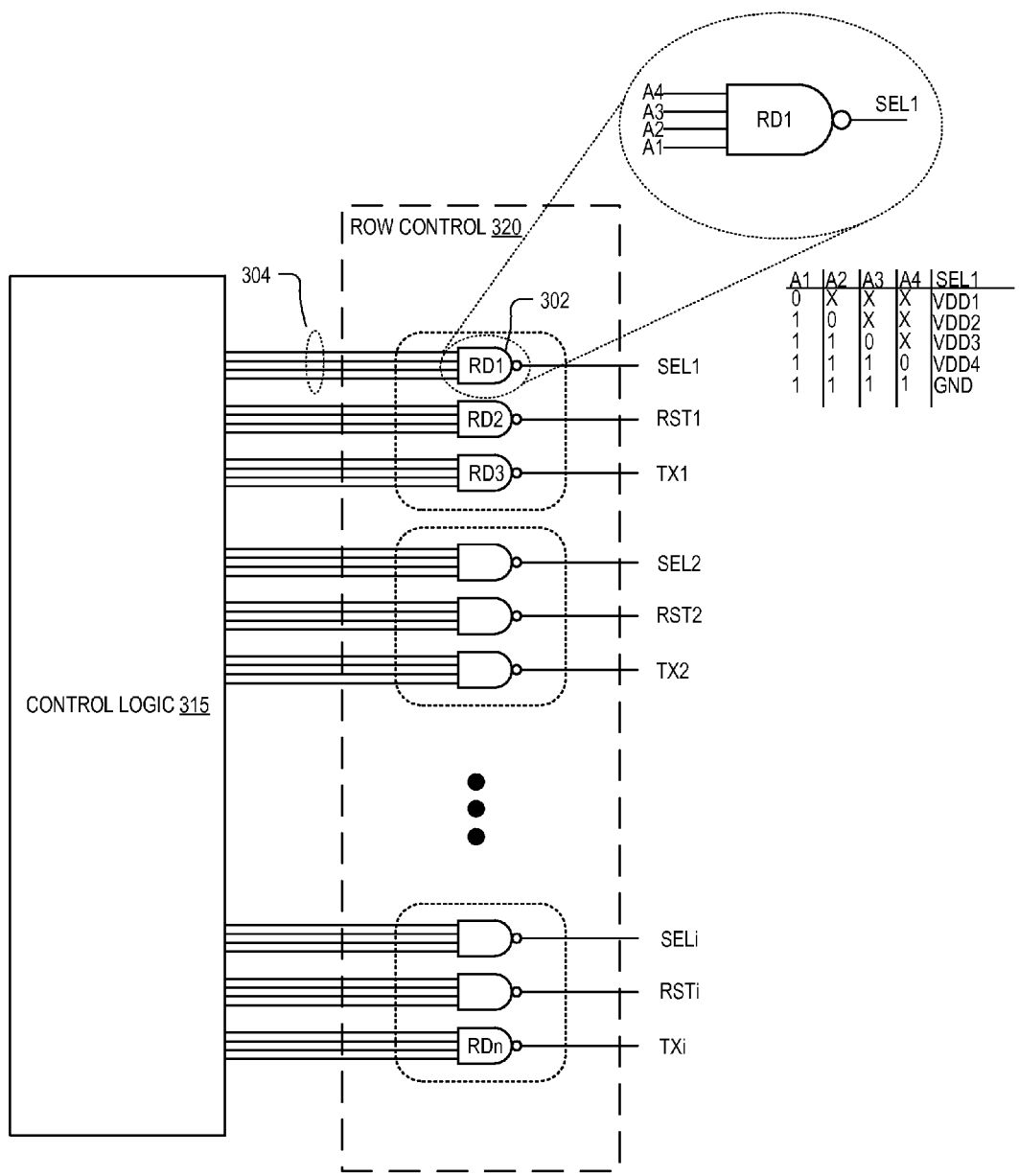
FIG. 3 is a functional block diagram illustrating a control logic circuit and row control circuit within an image sensor, in accordance with an embodiment of the invention.

FIG. 3 is a functional block diagram illustrating a control logic circuit 315 and a row control circuit 320 within an image sensor, in accordance with an embodiment of the invention. Control logic circuit 315 and row control circuit 320 are possible implementations of control logic circuit 115 and row control circuit 120, respectively, of FIG. 1. The illustrated example of row control circuit 320 includes a plurality of row drivers 302 (e.g., RD1, RD2, RD3, . . . , RDn). As shown, row drivers 302 are arranged into rows to provide driving voltages to drive transistors included in the pixels of their respective rows. For example, row driver RD1 provides the driving voltage SEL1 for the row select transistors included in the first row of a pixel array, row driver RD2 provides the driving voltage RST1 for the reset transistors included in the first row, and row driver RD3 provides the driving voltage TX1 for the transfer transistors included in the first row. FIG. 3 illustrates three row drivers 302 for each row for use with the 4T pixel architecture, as discussed above in FIG. 2. However, embodiments of the present invention are not limited to 4T pixel architectures, and thus row control circuit 320 may include any number of row drivers per row as needed for proper implementation of alternative pixel architectures, such as the 3T, 5T, and other designs.

FIG. 3 also illustrates control logic signals 304 generated by the control logic circuit 315. In operation, row drivers 302 provide a variable driving voltage to drive the transistors included in the pixels by adjusting a magnitude of the driving voltage in response to the control logic signals 304. For example, FIG. 3 illustrates row drivers 302 as NAND gates. The row driver NAND gates may output a driving voltage having a plurality of discrete non-zero voltage levels responsive to their respective inputs of control logic signals. In the illustrated embodiment, each row driver 302 is coupled to receive four control logic signal 304 to control their operation. By way of example, the exploded view of row driver RD1 illustrates four control logic signals A1, A2, A3, and A4, each of the inputs representing at least one bit. Row driver RD1 is configured to output a variable driving voltage SEL1 in response to these four inputs. For example, the logic table for row driver RD1 is as follows:

TABLE 1

| A1 | A2 | A3 | A4 | SEL1 |
|----|----|----|----|------|
| 0  | X  | X  | X  | VDD1 |
| 1  | 0  | X  | X  | VDD2 |
| 1  | 1  | 0  | X  | VDD3 |
| 1  | 1  | 1  | 0  | VDD4 |
| 1  | 1  | 1  | 1  | GND  |

Thus, in example of FIG. 1, control logic signal input A1 is a most significant bit (MSB), where row driver RD1 outputs a first driving voltage of VDD1 when input A1 is a logic LOW regardless of the logic state of the other inputs A2-A4. Also, row driver RD1 outputs a second driving voltage of VDD2 when input A1 is a logic HIGH and input A2 is a logic LOW, regardless of the logic state of inputs A3 and A4. Similarly, row driver RD1 outputs a third driving voltage of VDD3 when inputs A1 and A2 are a logic HIGH and input A3 is a logic LOW, regardless of the logic state of input A4. When inputs A1-A3 are a logic HIGH and input A4 is a logic LOW, row driver RD1 is configured to output a fourth driving voltage of VDD4. Lastly, row driver RD1 couples its output to ground (GND) when all of its inputs are at a logic HIGH state. As can be seen in this embodiment, the number of discrete non-zero voltage levels output by row driver RD1 is equal to the number of control logic signals input to the row driver RD1 (i.e., four control logic signals input and four discrete non-zero voltage levels output).

The remaining row drivers RD2 and RD3 of the first row of the array, and the row drivers of subsequent rows may be configured to operate in a similar matter as described above with respect to row driver RD1, each with their own respective control logic signal 304 inputs. However, in one embodiment, control logic signals 304 are provided on a shared bus of control logic signals A1-A4 with additional control logic signals (not shown) to enable a particular row driver when needed.

In operation, control logic circuit 315 generates the control logic signals 304 to control the transistors included in the pixels of the pixel array for the accumulation, transfer and resetting of charge accumulated in the photodiode. Furthermore, control logic circuit 315 determines the logic levels of the control logic signals 304 for adjusting the magnitude of the driving voltages supplied on row lines 106 by row drivers 302. In one embodiment, control logic circuit 315 may provide a first voltage level for driving the select transistors and a second voltage level for driving the reset transistors. In another embodiment, control logic circuit 315 may implement advanced control techniques that include the "smooth" transition of a transistor by varying the drive voltage from a first voltage level to a second voltage level during the turning-on or turning off of the transistor. For example, a transfer transistor, included in a pixel, may receive a drive voltage at a first voltage level to begin to turn on the transistor (e.g., operating in linear region) and then receives a second voltage level to fully turn on the transistor (e.g., operating in saturation region).

Figure 4:
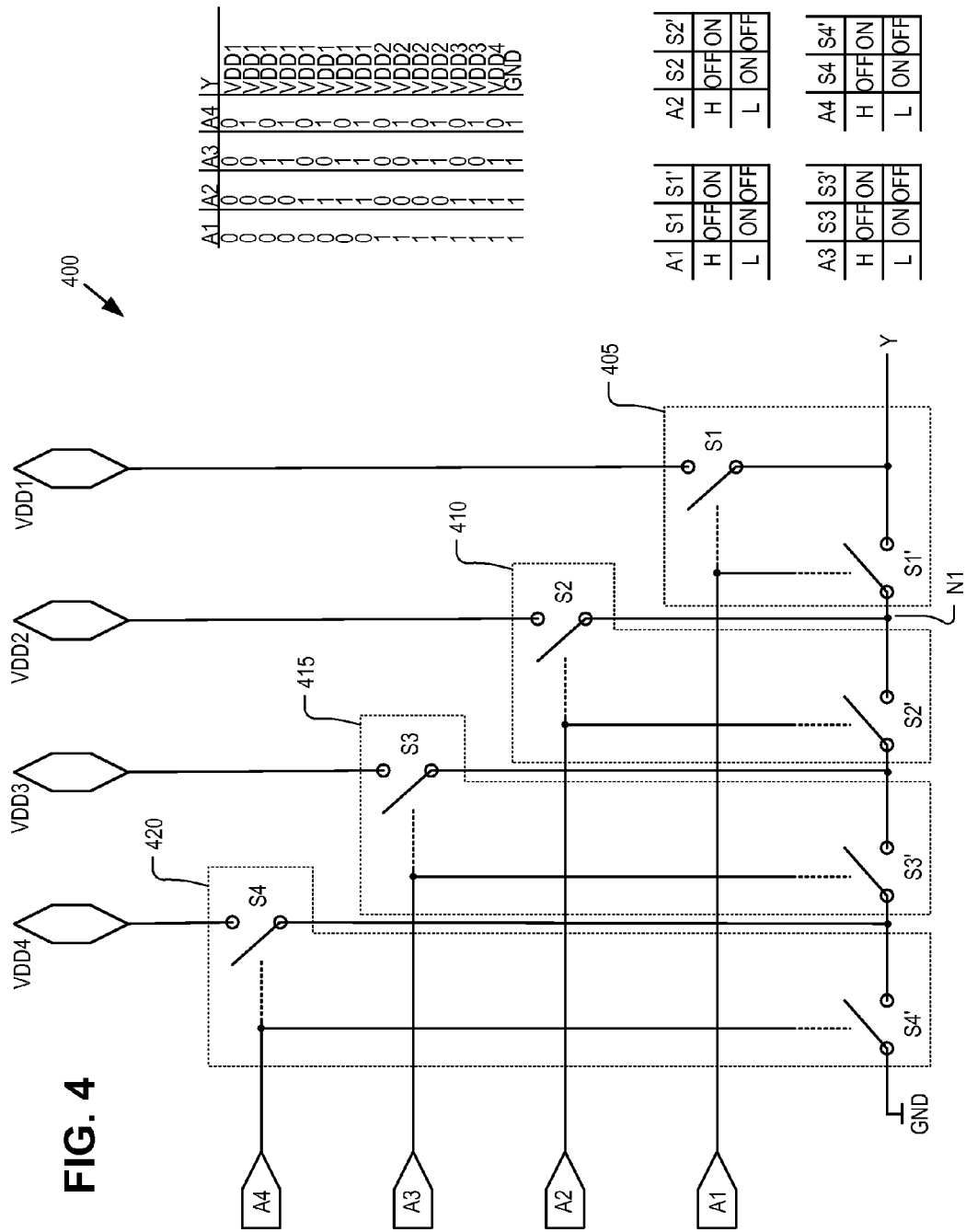
FIG. 4 is a functional block diagram illustrating a row driver within a row control circuit of an image sensor, in accordance with an embodiment of the invention.

FIG. 4 is a functional block diagram illustrating a row driver 400 within a row control circuit of an image sensor, in accordance with an embodiment of the invention. The illustrated example of row driver 400 includes switch units 405, 410, 415, and 420 and an output Y. Row driver 400 is one possible implementation of row driver 302 of FIG. 3. Thus, output Y may be the row select SEL driving voltage, the transfer TX driving voltage, or the reset RST driving voltage, as shown in FIGS. 2 and 3. Also illustrated in FIG. 4, are voltage sources VDD1, VDD2, VDD3, VDD4, control logic signal inputs A1-A4, and a ground potential GND.

As shown in FIG. 4, first switch unit 405 is coupled to receive a most significant bit (MSB) of the control logic signals (i.e., A1); second switch unit 410 and third switch unit 415 are coupled to receive the next most significant bits A2 and A3, respectively; and fourth switch unit 420 is coupled to receive the least significant bit (LSB) A4 of the control logic signals. Each switch unit is shown as including a pair of complementary switches that are controlled by their respective control logic signal input. For example, both switches S1 and S1', included in switch unit 405, are controlled by control logic signal input A1. However, switch S1 is configured to be turned on when switch S1' is turned off and vice versa. Thus, when control logic signal input A1 is a logic HIGH, switch S1 is off and switch S1' is on. Similarly, when control logic signal input A1 is a logic LOW, switch S1 is on and switch S1' is OFF. The inclusion of complementary switches in the switch units may prevent the shorting of voltage sources together during operation.

As shown in FIG. 4, switch S1, of the first switch unit 405, is configured to close such that the output Y of row driver 400 is coupled to the first voltage source VDD1 in response to the first control logic input A1 being in a LOW logic state. Furthermore, switch S1' is open in response to the first control logic input A1 being a logic LOW, thus preventing the coupling of the other voltage sources the output Y and allowing a driving voltage output by row driver 400 to be a voltage level of the first voltage source VDD1.

The first switch unit 405 is further configured to couple the output Y to the second switch unit 410 when the first control logic input A1 is a logic HIGH by opening switch S1 and closing switch S1'. Switch S2, of the second switch unit 410, is configured to close in response to the second control logic input A2 being in a LOW logic state, thus coupling the second voltage source VDD2 to node N1. However, as can be seen from FIG. 4, switch S1' must also be closed in order for the second voltage source VDD2 to be coupled to the output Y. Thus, a driving voltage at the voltage level of the second voltage source VDD2 requires that control logic signal input A1 be a logic HIGH and that control logic signal input A2 be a logic LOW. Furthermore, switch S2' is open in response to the second control logic input A2 being a logic LOW.

The operation of switch units 415 and 420 are similar to that described above with reference to switch units 405 and 410, with each including a complementary pair of switches (e.g., S3 and S3', and S4 and S4') and coupled to a respective voltage source (e.g., third voltage source VDD3 and fourth voltage source VDD4).

As can be seen from FIG. 4, the output Y of row driver 400 is coupled to ground potential GND in response to each of the control logic inputs A1-A4 being in the logic HIGH state. That is, when control logic inputs A1-A4 are a logic HIGH, switches S1, S2, S3, and S4 are open and switches S1', S2', S3', and S4' are closed to couple output Y to ground GND. Thus, in one embodiment, row driver 400 provides, at its output Y, a logic LOW when control logic inputs A1-A4 are a logic HIGH. Also, each of the disclosed voltage levels of voltage sources VDD1, VDD2, VDD3, and VDD4 are a logic HIGH for purposes of enabling one or more transistors, but allow for the varying of a magnitude of the drive voltage.

Figure 5:
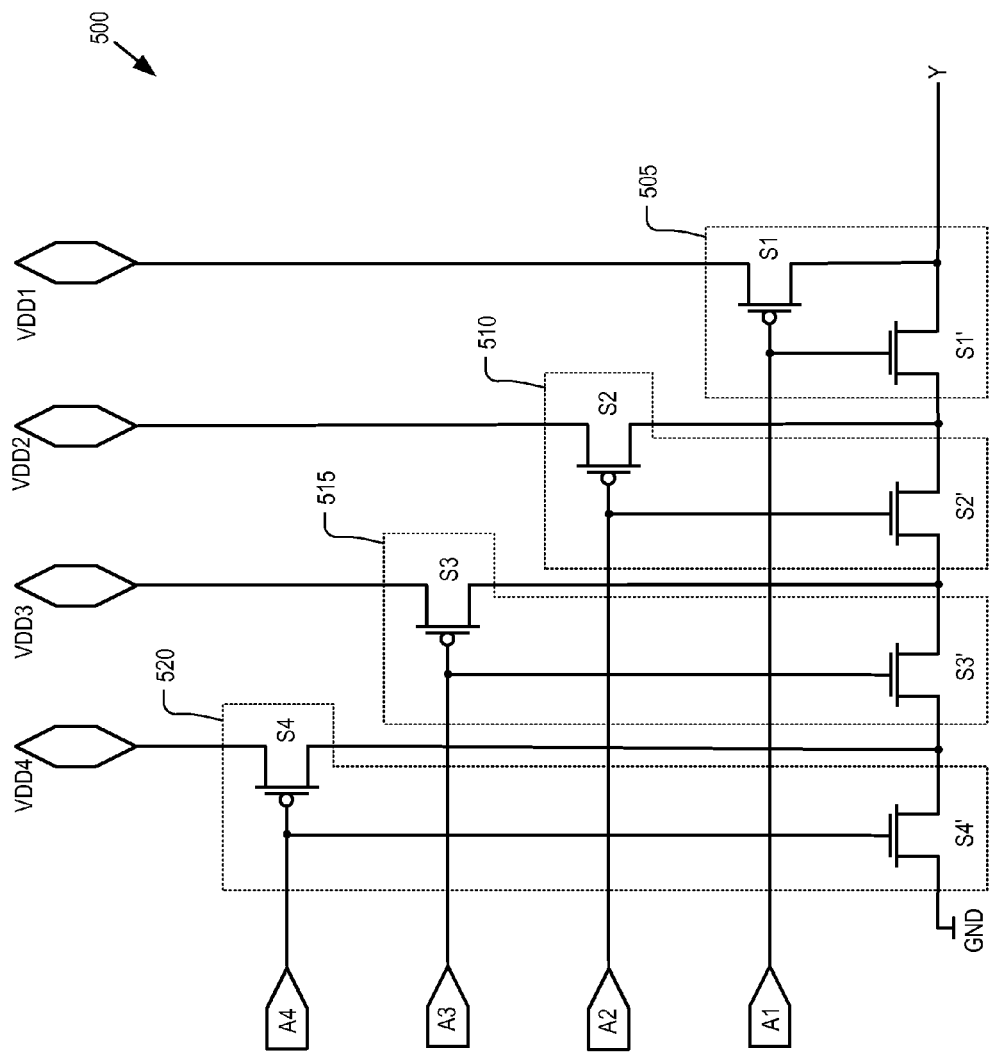
FIG. 5 is a circuit diagram of row driver, in accordance with an embodiment of the invention.

FIG. 5 is a circuit diagram of row driver 500, in accordance with an embodiment of the invention. The illustrated example of row driver 500 includes switch units 505, 510, 515, and 520 and an output Y. Row driver 500 is one possible implementation of row driver 302 of FIG. 3 and row driver 400 of FIG. 4. Thus, output Y may be the row select SEL driving voltage, the transfer TX driving voltage, or the reset RST driving voltage, as shown in FIGS. 2 and 3. Also illustrated in FIG. 5, are voltage sources VDD1, VDD2, VDD3, VDD4, control logic signal inputs A1-A4, and a ground potential GND. The operation of row driver 500 is similar to that of row driver 400 of FIG. 4, described above. However, row driver 500 illustrates the implementation of switches S1-S4 and S1'-S4' as metal-oxide-semiconductor-field-effect-transistors (MOSFETs). For example, FIG. 5 illustrates switches S1-S4 implemented as p-channel MOSFETs (p-MOSFET) and switches S1'-S4' implemented as n-channel MOSFETs (n-MOSFET).

In one embodiment (not shown) the p-MOSFETs may be switched with the n-channel MOSFETs and the logic adjusted accordingly in row driver 500, as would be understood by one or ordinary skill given the benefit of the present disclosure. In this alternate embodiment, switches S1-S4 may be implemented as n-MOSFETs and switches S1'-S4' as p-MOSFETs. Thus, in this example, a logic HIGH at control logic input A1 would coupled the first voltage source VDD1 to output Y, while switch S1' would be open.

Figure 6:
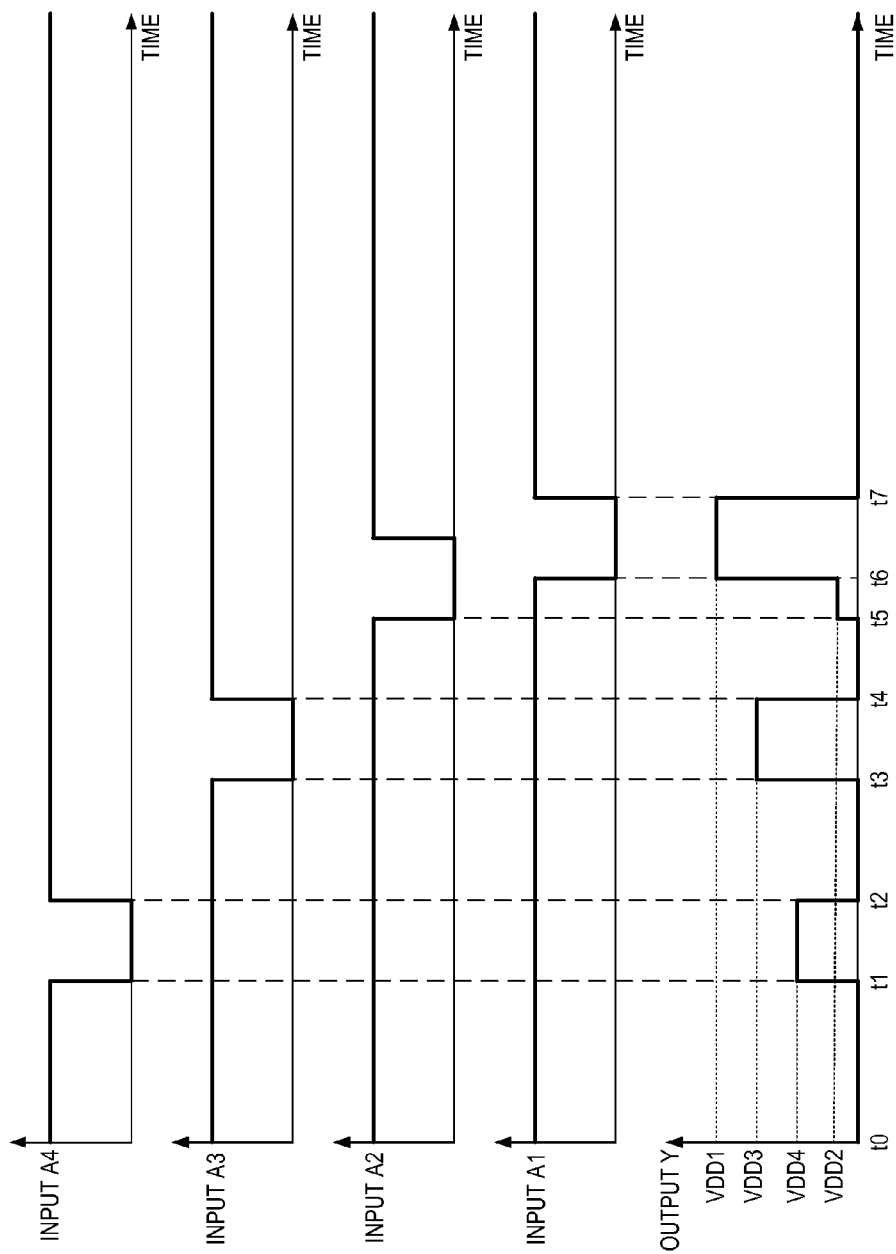
FIG. 6 is a timing diagram illustrating the output of a row driver, in accordance with an embodiment of the invention.

FIG. 6 is a timing diagram illustrating the output Y of a row driver, in accordance with an embodiment of the invention. The timing diagram of FIG. 6 will be described with reference to FIGS. 3, 5 and 6. At time t0, control logic circuit 315 provides control logic signals 304 (i.e., A1-A4), each having a logic HIGH level. Thus, each of the switches S1', S2', S3', and S4' of row driver 500 are enabled to couple the output Y to ground GND. At time t1 control logic input A4 transitions to a logic LOW, while the other control logic inputs remain at a logic HIGH, thereby enabling switch S4, disabling switch S4' and coupling output Y to the fourth voltage source VDD4. The output Y of row driver 500 is then coupled to ground GND at time T2 in response to the control logic input A4 transitioning back to a logic HIGH.

At time t3, control logic input A3 transitions to a logic LOW, while the other control logic inputs remain at a logic HIGH, thereby enabling switch S3, disabling switch S3' and coupling output Y to the third voltage source VDD3. The output Y of row driver 500 is again coupled to ground GND at time T4 in response to the control logic input A3 transitioning back to a logic HIGH.

Then at time T5, control logic input A2 transitions to a logic LOW, while the other control logic inputs remain at a logic HIGH, thereby enabling switch S2, disabling switch S2', and coupling output Y to the second voltage source VDD2. However, at time t6, control logic input A1 transitions to a logic LOW, thereby enabling switch S1, disabling switch S1', and coupling output Y to the first voltage source VDD 1. The disabling of switch S1' at time t6 disconnects the second voltage source VDD2 from the output Y even though switch S2 remains enabled to prevent the shorting together of voltage sources. In one embodiment, the output Y from time t5 to time t7 is referred to as a ladder-shaped output pulse and may be used for special control techniques. For example, a ladder-shaped output pulse may be provided by row driver 500 for the smooth turn-on of a transistor (e.g., transfer transistor) included in the pixel array, such as described above. Finally, at time t7, all control logic inputs are at a logic HIGH level thereby coupling output Y to the ground GND to provide a logic LOW at the output Y of ROW driver 500.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor comprising;
   a plurality of pixels arranged in an array of columns and rows;
   a row driver coupled to pixels in a row of the array to provide a variable driving voltage to drive transistors included in the pixels of the row; and
   a control logic circuit coupled to provide one or more control logic signals to the row driver, wherein the row driver adjusts a magnitude of the driving voltage in response to the one or more control logic signals, wherein the row driver comprises a plurality of switch units including a first switch unit coupled to receive a most significant bit (MSB) of the control logic signals, wherein the first switch unit couples an output of the row driver to a first voltage source in response to the MSB being in a first logic state, the plurality of switch units comprising a second switch unit coupled to the first switch unit, wherein the first switch unit couples the output of the row driver to the second switch unit in response to the MSB being in a second logic state, wherein the first switch unit comprises a first switch and a second switch, each switch of the first switch unit coupled to be controlled by the MSB of the control logic signals, wherein the first switch is configured to couple the first voltage source to the output of the row driver in response to the MSB being in the first logic state and the second switch is configured to couple the output of the row driver to the second switch unit in response to the MSB being in the second logic state.

2. The image sensor of claim 1, wherein the row driver is a NAND gate that outputs the driving voltage having a plurality of discrete non-zero voltage levels responsive to the one or more control logic signals.

3. The image sensor of claim 1, wherein a number of the discrete non-zero voltage levels is the same as a number of the control logic signals coupled to the input of the NAND gate.

4. The image sensor of claim 1, wherein the second switch unit is coupled to receive a second bit of the control logic signals, and wherein the second switch unit couples the output of the row driver to a second voltage source in response to the MSB being in the second logic state and the second bit being in the first logic state.

5. The image sensor of claim 4, wherein the plurality of switch units are configured to couple the output of the row driver to ground in response to each of their respective bits of the control logic signals being in the second logic state.

6. The image sensor of claim 5, wherein the first logic state is a logic LOW and the second logic state is a logic HIGH.

7. The image sensor of claim 1, wherein one of the first and second switches comprises a p-channel-metal-oxide-semiconductor-field-effect-transistor (p-MOSFET) and the other of the first and second switches comprises an n-channel-metal-oxide-semiconductor-field-effect-transistor (n-MOSFET).

8. The image sensor of claim 1, wherein the image sensor is a complementary metal-oxide-semiconductor ("CMOS") image sensor.

9. An image sensor comprising;
   a plurality of pixels arranged in an array of columns and rows;
   a control logic circuit coupled to provide a first control logic signal and a second control logic signal; and
   a row driver coupled to pixels in a row of the array to provide a variable driving voltage to drive transistors included in the pixels of the row and to adjust a magnitude of the driving voltage in response to the one or more control logic signals, wherein the row driver comprises:
   a first switch unit coupled to receive the first control logic signal, wherein the first switch unit couples an output of the row driver to a first voltage source in response to the first control logic signal being in a first logic state;
   a second switch unit coupled to the first switch unit, wherein the first switch unit couples the output of the row driver to the second switch unit in response to the first control logic signal being in a second logic state, wherein the second switch unit is coupled to receive the second control logic signal, and wherein the second switch unit couples the output of the row driver to a second voltage source in response to the first control logic signal being in the second logic state;
   a third switch unit coupled to the second switch unit, wherein the second switch unit couples the output of the row driver to the third switch unit in response to the second control logic signal being in a second logic state, wherein the third switch unit is coupled to receive a third control logic signal, and wherein the third switch unit couples the output of the row driver to a third voltage source in response to the third control logic signal being in the first logic state; and
   a fourth switch unit coupled to the third switch unit, wherein the third switch unit couples the output of the row driver to the fourth switch unit in response to the third control logic signal being in a second logic state, wherein the fourth switch unit is coupled to receive a fourth control logic signal, and wherein the fourth switch unit couples the output of the row driver to a fourth voltage source in response to the fourth control logic signal being in the first logic state.

10. The image sensor of claim 9, wherein the fourth switch unit is configured to couple the output of the row driver to ground in response to fourth control signal being in the second logic state.

11. The image sensor of claim 10, wherein the first logic state is a logic LOW and the second logic state is a logic HIGH.

12. The image sensor of claim 9, wherein the first switch unit comprises a first switch and a second switch, each switch of the first switch unit coupled to be controlled by the first control logic signal, wherein the first switch is configured to couple the first voltage source to the output of the row driver in response to the first control logic signal being in the first logic state and the second switch is configured to couple the output of the row driver to the second switch unit in response to the first control logic signal being in the second logic state.

13. The image sensor of claim 12, wherein one of the first and second switches comprises a p-channel-metal-oxide-semiconductor-field-effect-transistor (p-MOSFET) and the other of the first and second switches comprises an n-channel-metal-oxide-semiconductor-field-effect-transistor (n-MOSFET).

14. The image sensor of claim 9, wherein the image sensor is a complementary metal-oxide-semiconductor ("CMOS") image sensor.

\* \* \* \* \*